United States Patent
Orchard et al.

(10) Patent No.: US 11,897,543 B2
(45) Date of Patent: Feb. 13, 2024

(54) VEHICLE CHASSIS SHEAR PLATE

(71) Applicant: Rivian IP Holdings, LLC, Plymouth, MI (US)

(72) Inventors: Allen Orchard, Shepperton (GB); Jiacheng Huang, Troy, MI (US); Vamsi Charan Pulugurtha, Aliso Viejo, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/385,065

(22) Filed: Jul. 26, 2021

(65) Prior Publication Data

US 2023/0022199 A1    Jan. 26, 2023

(51) Int. Cl.
*B62D 21/15* (2006.01)
*B62D 27/02* (2006.01)
*B60K 1/04* (2019.01)

(52) U.S. Cl.
CPC ............... *B62D 21/15* (2013.01); *B60K 1/04* (2013.01); *B62D 27/023* (2013.01); *B60Y 2306/01* (2013.01)

(58) Field of Classification Search
CPC ........ B62D 21/15; B62D 27/023; B60K 1/04; B60Y 2306/01
See application file for complete search history.

(56) References Cited

U.S. PATENT DOCUMENTS

| 2003/0085592 | A1* | 5/2003 | Seksaria | ................ | B60K 5/12 |
| | | | | | 296/193.09 |
| 2013/0270861 | A1* | 10/2013 | Young | ................ | B62D 21/155 |
| | | | | | 296/187.09 |
| 2019/0322164 | A1* | 10/2019 | Sasaki | ................ | B62D 21/155 |
| 2021/0221438 | A1* | 7/2021 | Ohno | ................ | B62D 65/00 |

* cited by examiner

*Primary Examiner* — Jason D Shanske
*Assistant Examiner* — Matthew James O'Neill
(74) *Attorney, Agent, or Firm* — Haley Guiliano LLP

(57) ABSTRACT

A vehicle includes a battery system arranged in a central region. The battery system includes corners corresponding to corners of an end of the vehicle, and respective chassis components are arranged at each corner. Respective shear brackets are affixed to the vehicle frame to a respective chassis component. The shear brackets are configured to absorb energy from the chassis components during deceleration events. The chassis components may include a knuckle configured to engage with the frame at an interface, to which the shear bracket may be added. Each shear bracket is formed from metal, such as sheet metal, and includes mounting features such as holes or studs to affix to the frame. The shear brackets are configured to limit intrusion of the chassis components into the battery system by absorbing energy. A bolt or fastener affixing a chassis component to the frame is strengthened by the shear bracket.

19 Claims, 9 Drawing Sheets

VEHICLE CHASSIS SHEAR PLATE

INTRODUCTION

The present disclosure is directed to a shear bracket for preventing or limiting intrusion of chassis components or assemblies from intruding into a battery pack. Intrusion of chassis components, from failure or displacement, into the battery system can cause damage during crash events. The shear bracket is configured to absorb energy from events to protect the battery system.

SUMMARY

The present disclosure is directed to a shear bracket for preventing or limiting intrusion of chassis components or assemblies from intruding into a battery pack. The shear bracket affixes to a frame of the vehicle and to at least one chassis component, which itself may be an assembly, to stiffen a joint between the chassis component and the frame element against displacement.

In some embodiments, the present disclosure is directed to an assembly of a vehicle including a shear bracket. The shear bracket is affixed to a chassis component and to a frame element, and is configured to absorb energy from the chassis component associated with a deceleration event to reduce energy transferring to a battery system.

In some embodiments, the assembly may also include at least one frame element configured to provide structural rigidity to the vehicle and a chassis component configured to be affixed to the frame element. In some embodiments, the battery system is affixed to the frame element, and the shear bracket is configured to absorb the energy to maintain a gap between the battery system and the chassis component.

In some embodiments, the vehicle includes the assembly, wheels, an occupant compartment, and a battery system. The shear bracket is configured to be affixed to the at least one frame element at a first lateral location and a second lateral location. The shear bracket is also affixed to the chassis component and is configured to provide stiffness against displacement of the chassis component during an event. In some embodiments, the chassis component forms a gap with a battery system, and the shear bracket is configured to provide stiffness against the chassis component intruding on the battery system. In some embodiments, the chassis component includes a knuckle, and the shear bracket is bolted through the knuckle to a mounting feature on the frame element of the vehicle frame at the second lateral location to reduce the energy transferring to the battery system. For example, the chassis component may be a cast metal part having a knuckle configured to be bolted to the frame or a frame element thereof.

In some embodiments, the shear bracket includes a first hole configured to be aligned to the first lateral location, and a second hole configured to be aligned to the second lateral location. To illustrate, the shear bracket is configured to absorb energy between the first and second lateral locations. In some embodiments, the shear bracket is formed from, or otherwise includes, a sheet metal material configured to provide stiffness against displacement of the chassis component toward the first lateral location, which further reduces the energy transferring to the battery system. In some embodiments, the shear bracket is configured to buckle between the first location and the second location under loading from the event.

In some embodiments, the frame element includes a first hole arranged at the first lateral location, and a second hole arranged at the second lateral location. In some embodiments, the assembly includes a first bolt engaged with the first hole to affix the shear bracket at the first lateral location, and a second bolt engaged with the second hole to affix the shear bracket at the second lateral location and the chassis component at the second lateral location. The first lateral location and the second lateral location may be separated by a span distance, and the attachment points or joints may be offset vertically. The shear bracket may engage with the first and second bolts to reduce the energy transferring to the battery system (e.g., the bolts may affix the shear plate to the frame element and the chassis component).

In some embodiments, the present disclosure is directed to a vehicle that includes a battery system and a shear bracket. The shear bracket affixed to the frame element at a first lateral location and to a chassis component at a second lateral location, wherein the shear bracket is configured to absorb energy from the chassis component to reduce energy transferring to the battery pack. In some embodiments, for example, the chassis component includes a knuckle, and the shear bracket is bolted to the frame element through the knuckle at the second lateral location to reduce the energy transferring to the battery pack. In some embodiments, the shear bracket includes a sheet metal material configured to reduce displacement of the chassis component toward the first lateral location, which further reduces the energy transferring to the battery pack. In some embodiments, the shear bracket is configured to buckle between the first location and the second lateral location to reduce the energy transferring to the battery pack. In some embodiments, the shear bracket is bolted to the frame element at the first lateral location and at the second lateral location to absorb the energy. For example, in some embodiments, the vehicle includes a first bolt engaged with the first hole to affix the shear bracket at the first lateral location, and a second bolt engaged with the second hole to affix the shear bracket at the second lateral location and the chassis component at the second lateral location. In some embodiments, the shear bracket is a first shear bracket, and the vehicle includes a second shear bracket affixed to a second chassis component and configured to absorb energy from the second chassis component to reduce energy transferring to the battery pack.

In some embodiments, the present disclosure is directed to an arrangement of a vehicle, including a battery system, first and second chassis components, and first and second shear brackets. The battery system includes a first end, such as the front or rear, the first end corresponds to a first corner and a second corner of the vehicle, such as the rear right and rear left corners. The first chassis component corresponds to a first wheel arranged at the first corner of the vehicle, and the first chassis component is affixed to a frame at a first joint. The second chassis component corresponds to a second wheel arranged at the second corner of the vehicle, and the first chassis component is affixed to the frame at a second joint. To illustrate, in some embodiments, the first and second wheel are rear wheels of the vehicle, arranged at either side of the vehicle. The first and second shear brackets are configured to absorb energy from the respective first and second joints to reduce energy being transferred to the battery system. The first shear bracket is affixed to the first chassis component and to the frame, and the first shear bracket is configured to resist displacement of the first joint. The second shear bracket affixed to the second chassis component and to the frame, and the second shear bracket is configured to resist displacement of the second joint.

In some embodiments, the arrangement includes a first frame element that corresponds to the first corner, and the first shear bracket is affixed to the first frame element at a first lateral location and at a second lateral location. In some such embodiments, the arrangement also includes a second frame element that corresponds to the second corner, and the second shear bracket is affixed to the second frame element at a third lateral location and at a fourth lateral location.

In some embodiments, the first joint is arranged at the second lateral location, and the second joint is arranged at the fourth lateral location. In some embodiments, the first chassis component includes a knuckle, and the arrangement includes a first fastener affixing the first shear bracket to the first knuckle and to the first frame element at the second lateral location. In some embodiments, the first shear bracket is configured to maintain a first gap between the battery system and the first chassis component, and the second shear bracket is configured to maintain a second gap between the battery system and the second chassis component.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to a rear chassis structure of a vehicle for protecting a battery pack. In some embodiments, the chassis structure includes a shear bracket to absorb energy from a crash event before transferring energy into a battery pack. To illustrate, the shear bracket may help ensure repeatability in crash performance, even in case of an unexpected fracture of a rear chassis casting. To illustrate further, the size, thickness and mounting strategy for the shear bracket to the chassis and body may affect the protection of the battery pack. In some embodiments, the structures of the present disclosure address the issue of preventing intrusion of chassis components into the battery system during impact, and loading and deformation of the vehicle thereof. In an illustrative example, the structures of the present disclosure include one or more shear brackets. For example, the vehicle may include two shear brackets, one on either side of the vehicle, to prevent intrusion.

Figure 1:
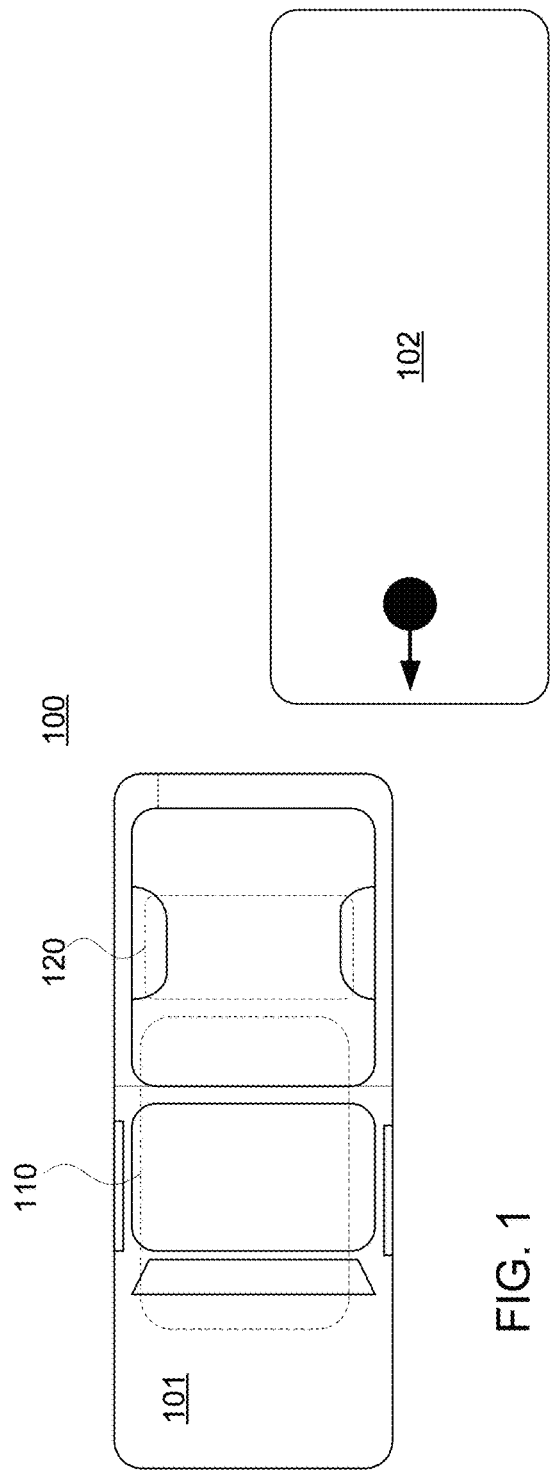
FIG. 1 shows a top view of an arrangement of a vehicle and a barrier prior to a collision, in accordance with some embodiments of the present disclosure.

FIG. 1 shows a top view of an arrangement 100 of vehicle 101 and barrier 102 prior to a collision, in accordance with some embodiments of the present disclosure. Vehicle 101 includes a chassis structure in accordance with the present disclosure. Arrangement 100 corresponds to a pre-event arrangement, wherein vehicle 101 and barrier 102 are approaching each other (e.g., either or both may be moving). For example, vehicle 101 and barrier 102 (e.g., which may be another vehicle) may be approaching head-on, one vehicle may be stationary and the other approaching, or alternatively (not shown), barrier 102 may be a substantially rigid barrier. In any of these scenarios, vehicle 101 is configured to prevent or otherwise limit intrusion of chassis components 120 into battery system 110. A collision can cause significant damage to a vehicle, including intrusion into the battery system, which may damage battery cells, power electronics components, a DC bus system, or other aspects of the battery system. To illustrate, chassis components 120 may include cast components that may crack or fracture, bolts that may fracture, or other components that may fracture or deform. The present disclosure is directed to a chassis shear bracket that helps prevent failure or otherwise lessens the effects of a failure in chassis components.

Figure 2:
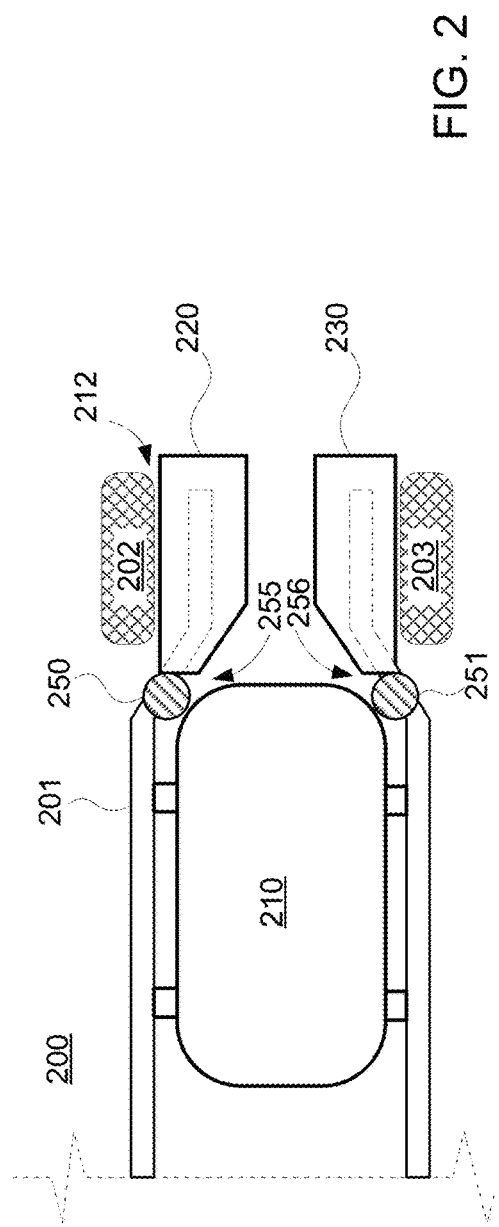
FIG. 2 shows a bottom view of a vehicle having a battery system, chassis components, and shear brackets, in accordance with some embodiments of the present disclosure.

FIG. 2 shows a bottom view of vehicle 200 having battery system 210, chassis components 220 and 230, and shear brackets 250 and 251, in accordance with some embodiments of the present disclosure. Shear brackets 250 and 251 are configured to absorb energy from respective chassis components 220 and 230 associated with a deceleration event to reduce energy transferring to battery system 210. Chassis components 220 and 230 are affixed to frame 201 of vehicle 200, and are coupled to respective wheels 202 and 203. Frame element forms, accommodates, or otherwise corresponds to wheel well 212, in which wheel 202 is arranged. Battery system 210 is also affixed to frame 201 of vehicle 200 (e.g., by crossmembers, fasteners, or a combination thereof). Gaps 255 and 256 exist between battery system 210 and respective chassis components 220 and 230 in a nominal configuration (e.g., substantially undeformed, normal, or otherwise pre-event). In some embodiments, for example, battery system 210 is affixed to a frame element of frame 201, and either or both of shear brackets 250 and 251 are configured to absorb the energy to maintain respective gaps 255 and 256 between battery system 210 and respective chassis components 220 and 230. Shear brackets 250 and 251 are configured to provide stiffness against displacement of respective chassis components 220 and 230. During an event, gaps 255 and 256 may lessen, or cease to exist, due to loading of frame 201, chassis components 220 and 230, other parts of vehicle 200, or a combination thereof. Shear brackets 250 and 251 help to prevent or otherwise lessen any decrease in gaps 255 and 256, as well as prevent a fracture-type failure of fasteners or other interface between chassis components 220 and 230 and frame 201. For example, chassis components 220 and 230 may include cast components, or other components that may fracture. If chassis components 220 and 230 are bolted to frame 201, the bolts may be susceptible to shear fracture. Such fractures or failures of chassis components 220 and 230, or corresponding fasteners, may result in a discontinuous force loading, which can lead to impacts. Shear brackets 250 and 251 lessen the chance of such a failure, thus providing a smoother load transfer (e.g., so that chassis components 220 and 230 do not impact or intrude into battery system 210). In an illustrative example, chassis components 220 and 230 may include suspension components (e.g., springs, struts, shocks, sway bars), control arms (e.g., A-arms), steering components (e.g., tie-rods, spindles, steering knuckles), braking components (e.g., rotors, drums, calipers, hubs, bearings, mounting elements), universal drive joints, any other suitable components or subsystems, or any combination thereof.

In an illustrative example, the arrangement of components of vehicle 200 may correspond to an end of battery system 210. For example, battery system 210 may include a front end and a back end, and each end may correspond to two corners (e.g., rear right and left, and front right and left. Accordingly, chassis components 220 and 230 are arranged at first and second corners corresponding to wheel 202 (e.g., a first wheel) and wheel 203 (e.g., a second wheel).

Figure 3:
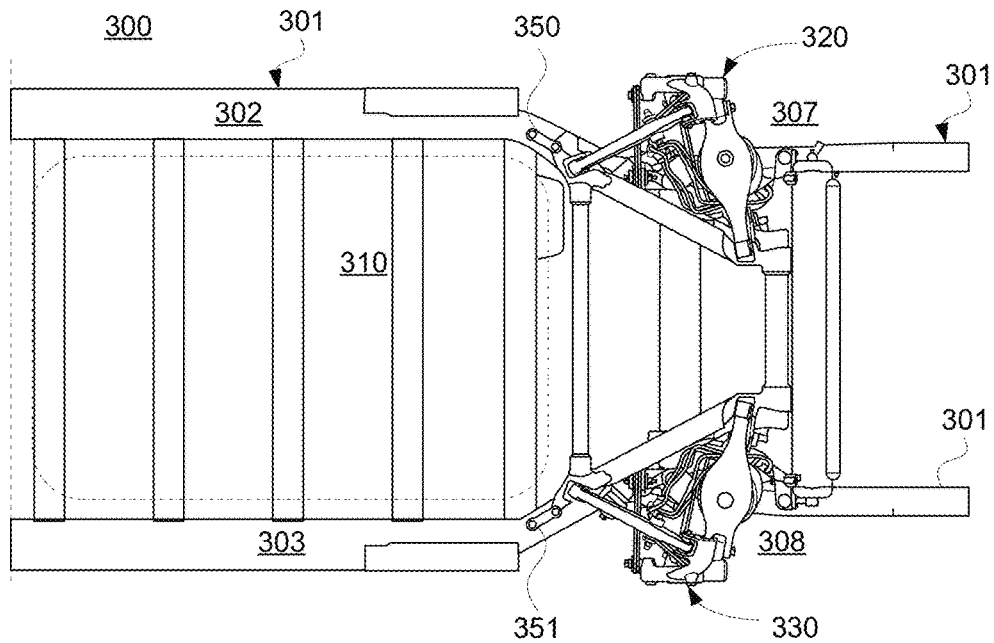
FIG. 3 shows a bottom view of a portion of a vehicle having shear brackets, in accordance with some embodiments of the present disclosure.
Figure 4:
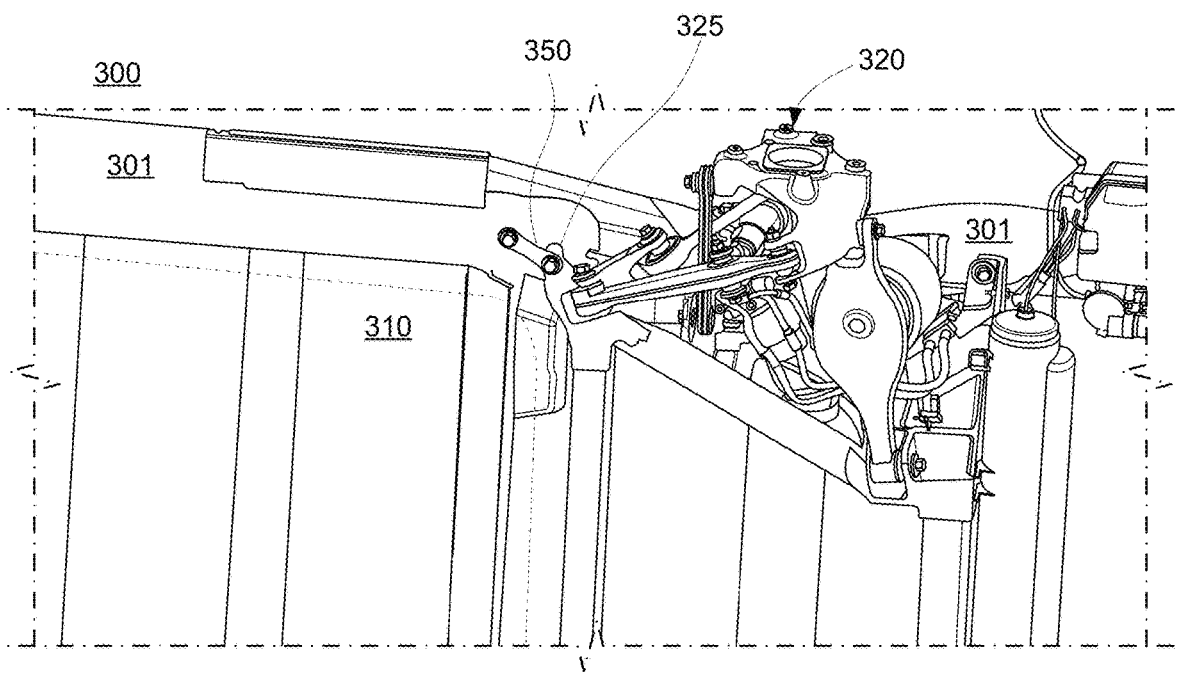
FIG. 4 shows a perspective view, from below, of the portion of the vehicle of FIG. 3, in accordance with some embodiments of the present disclosure.

FIG. 3 shows a bottom view of a portion of vehicle 300 having shear brackets, in accordance with some embodiments of the present disclosure. FIG. 4 shows a perspective view, from below, of the portion of vehicle 300 of FIG. 3, in accordance with some embodiments of the present disclosure. Shear brackets 350 and 351 are coupled to respective chassis components 320 and 330 (e.g., each being an assembly of components as illustrated), and also to frame 301. Further, shear brackets 350 and 351 are configured to prevent intrusion of respective chassis components 320 and 330 into battery system 310. As illustrated in FIG. 4, shear bracket 350 includes two holes, one corresponding to frame 301 (e.g., bolted to frame 301) and one corresponding to chassis component 320 (e.g., bolted to chassis component 320 and frame 301). Chassis component 320 includes element 325, along with steering, suspension, and braking components. Element 325, as illustrated, may include a casting having a knuckle that is bolted to shear bracket 350 (e.g., which is secured to frame 301). Shear bracket 350 is also secured to frame 301 by another bolt. Shear bracket 351 is similarly affixed to chassis component 330 and frame 301. Shear brackets 350 and 351 provide shear strength to the joint between frame 301 and elements 325, preventing or otherwise reducing the propensity of the corresponding bolt to fracture. To illustrate further, during an event, shear brackets 350 and 351 also prevent or otherwise reduce intrusion of chassis components 320 and 330 into battery system 310 by imparting stiffness against deformation (e.g., to limit encroachment of element 325 to battery system 310 or other components). In some embodiments, shear brackets 350 and 351 may be retrofitted into vehicle 300, or otherwise included without redesign of chassis components 320 and 330. For example, shear brackets 350 and 351 may be add-on components configured to strengthen an existing assembly. To illustrate, chassis components 320 and 330 may be configured to be affixed to frame 301 (e.g., first and second frame elements 302 and 303, respectively) in the absence of shear brackets 350 and 351, which may be added to provide material strength.

In an illustrative example, the arrangement of components of vehicle 300 may correspond to an end of battery system 310. For example, battery system 310 may include a front end and a back end, and each end may correspond to two corners (e.g., rear right and left, and front right and left. Accordingly, chassis components 320 and 330 are arranged at first and second corners corresponding to the back end.

Figure 5:
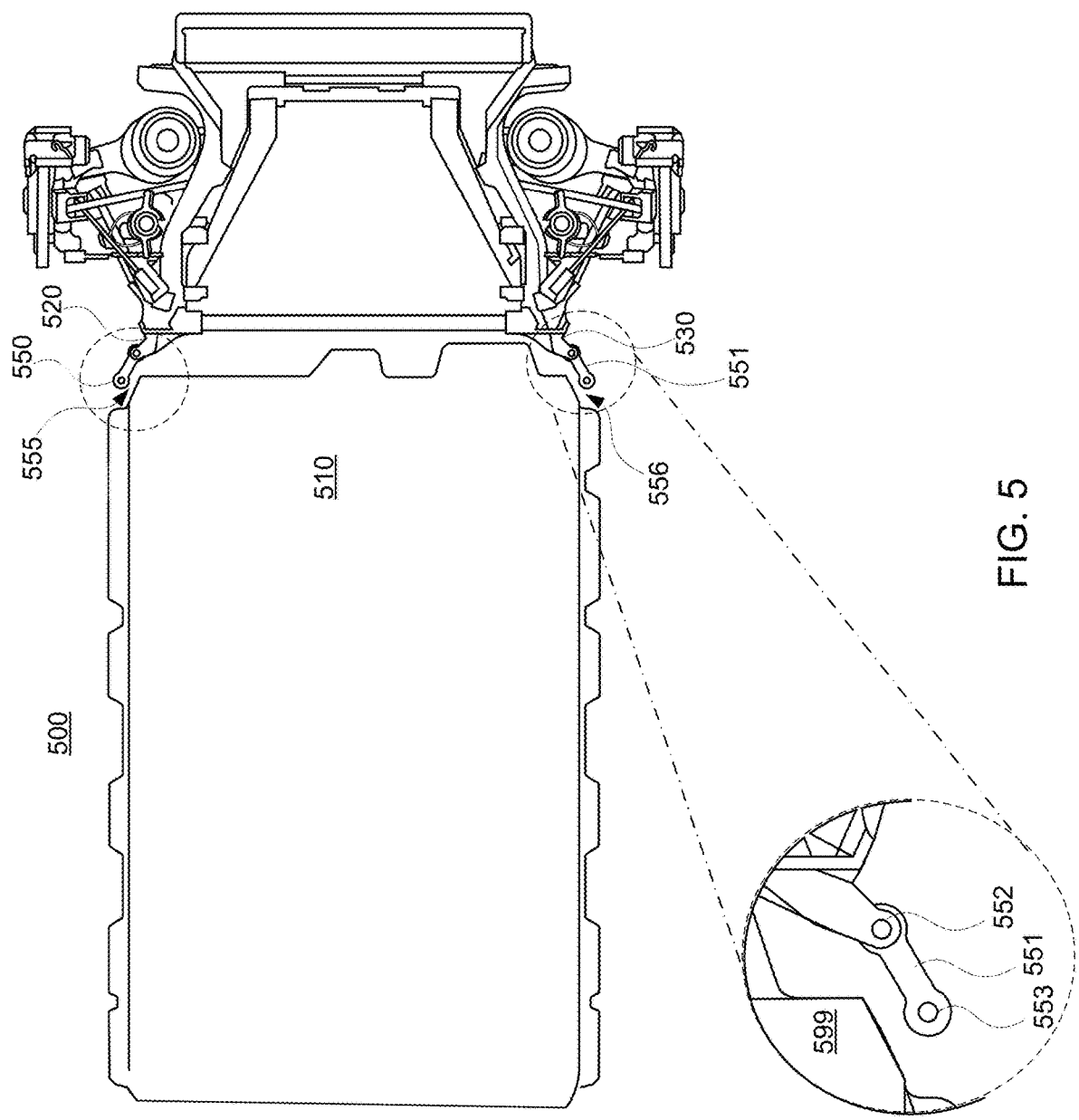
FIG. 5 shows a bottom view of a portion of a vehicle having a battery system and a chassis system, with the frame removed for purposes of clarity, in accordance with some embodiments of the present disclosure.

FIG. 5 shows a bottom view of a portion of vehicle 500 having battery system 510 and a chassis system (e.g., including chassis components 520 and 530), with the frame removed for purposes of clarity, in accordance with some embodiments of the present disclosure. The rear of vehicle 500 is rightwards, as illustrated in FIG. 5. Shear brackets 550 and 551 are coupled to chassis components 520 and 530 and to the frame (e.g., a frame element thereof), and are configured to maintain gaps 555 and 556 (e.g., by absorbing the energy to maintain respective gaps 555 and 556 between battery system 510 and respective chassis components 520 and 530). Enlargement 599 shows shear bracket 551, having holes 552 and 553 (e.g., at first and second lateral locations), more clearly. Shear bracket 550 also includes two mounting locations (e.g., at third and fourth lateral locations). To illustrate, hole 552 is configured to engage with chassis component 530 (e.g., via a bolt or other fastener or affixment), while hole 553 is configured to engage with a frame of vehicle 500 (e.g., via a bolt or other fastener or affixment). In some embodiments, shear brackets 550 and 551 are steel (e.g., and less susceptible to fracture than more brittle materials), and are configured to provide some stiffness to deformation to the joint between the frame and chassis components 520 and 530, corresponding fasteners, or a combination thereof. As illustrated, shear brackets 550 and 551 each include two holes, and are oblong-shaped. It will be understood that a shear bracket may be oblong, triangular, round, rectangular, irregular-shaped, any other suitable shape, having any suitable number of holes or mounting features, or any combination thereof. For example, a mounting bracket may be configured to mount to two locations (e.g., a chassis component and a frame), or more than two locations.

Figure 6:
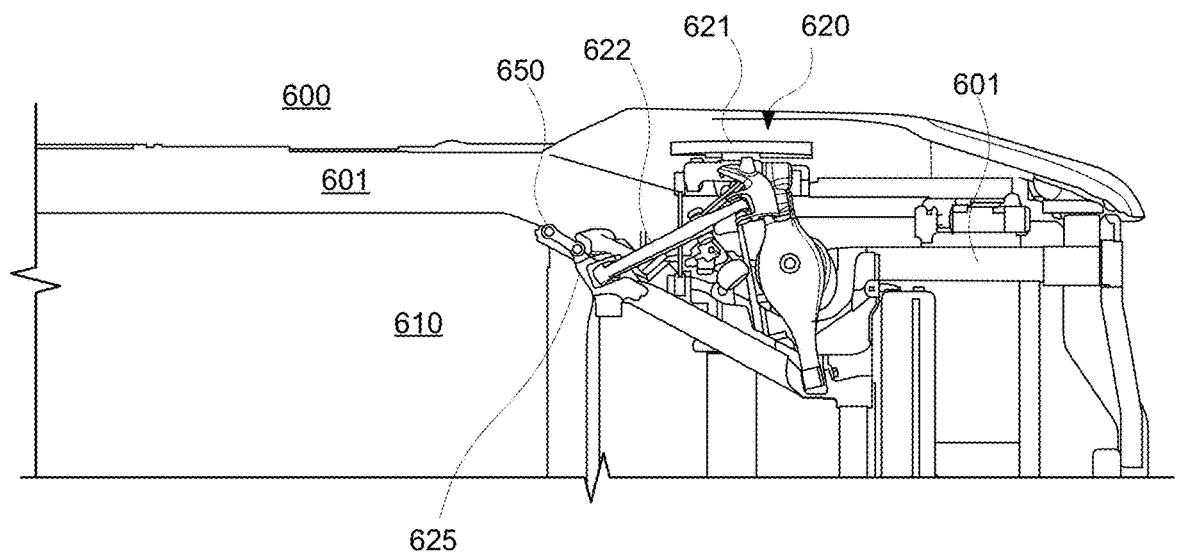
FIG. 6 shows a bottom view of a portion of a vehicle having a shear bracket, in accordance with some embodiments of the present disclosure.
Figure 7:
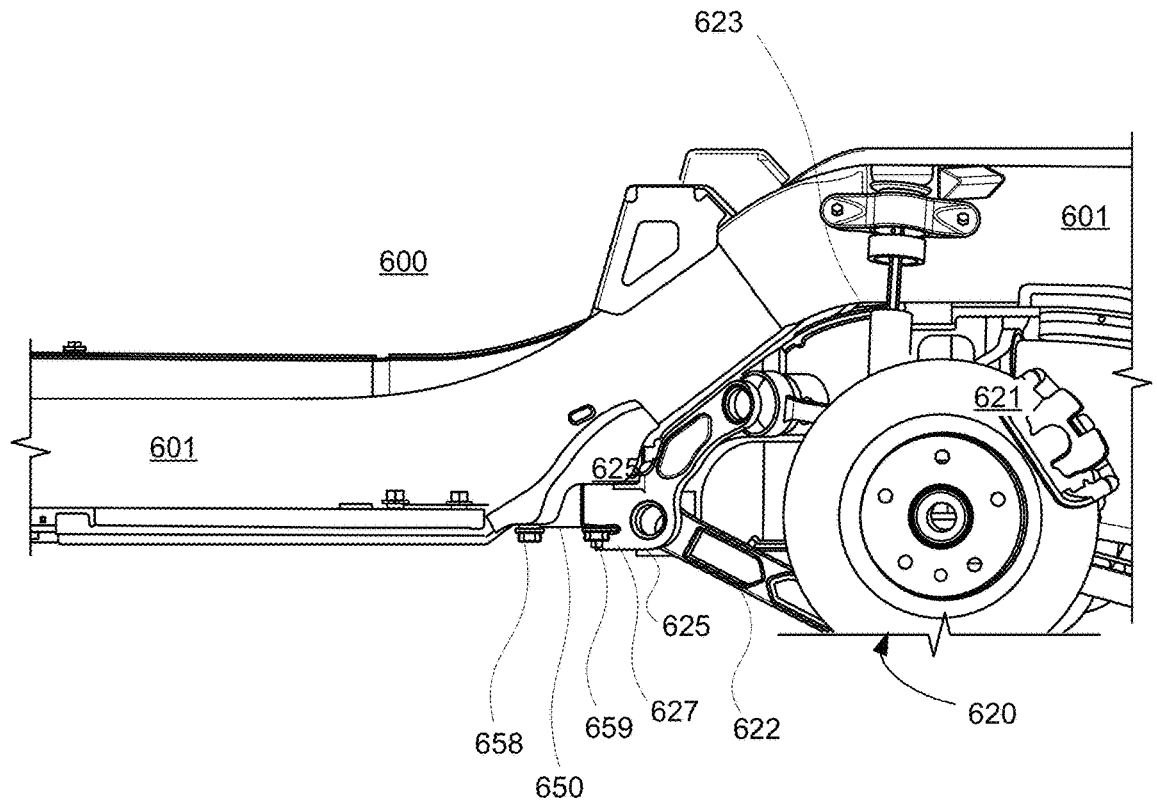
FIG. 7 shows a side view of a portion of the vehicle of FIG. 6, in accordance with some embodiments of the present disclosure.
Figure 8:
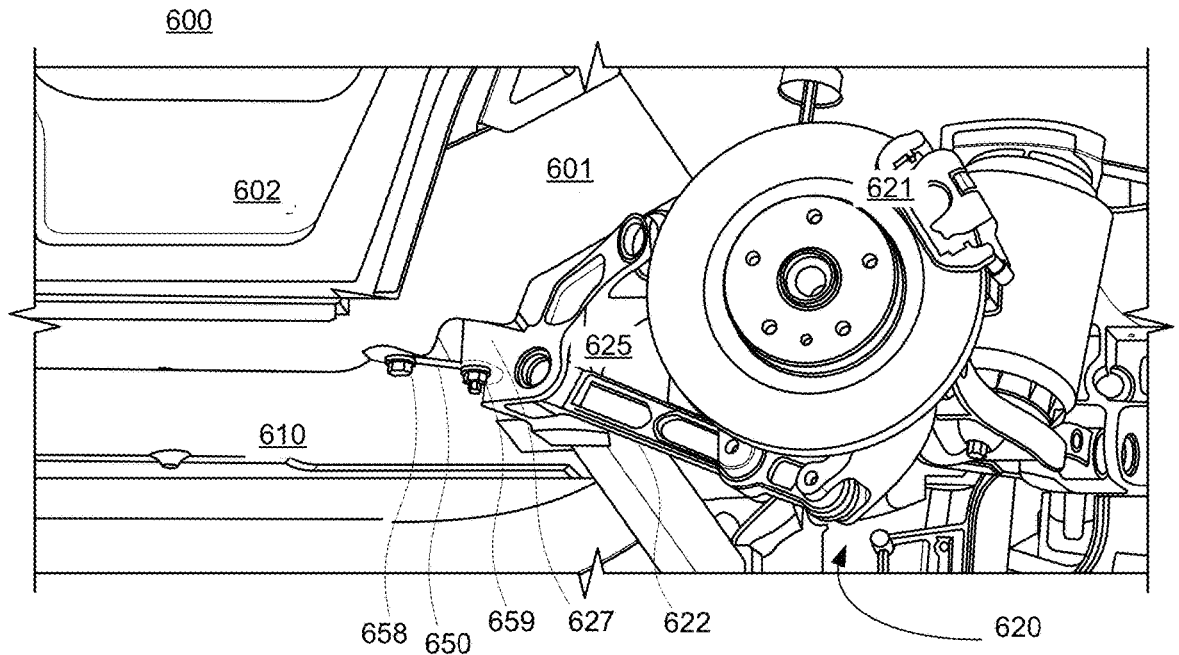
FIG. 8 shows a perspective view, from below, of a portion of the vehicle of FIG. 6, in accordance with some embodiments of the present disclosure.
Figure 9:
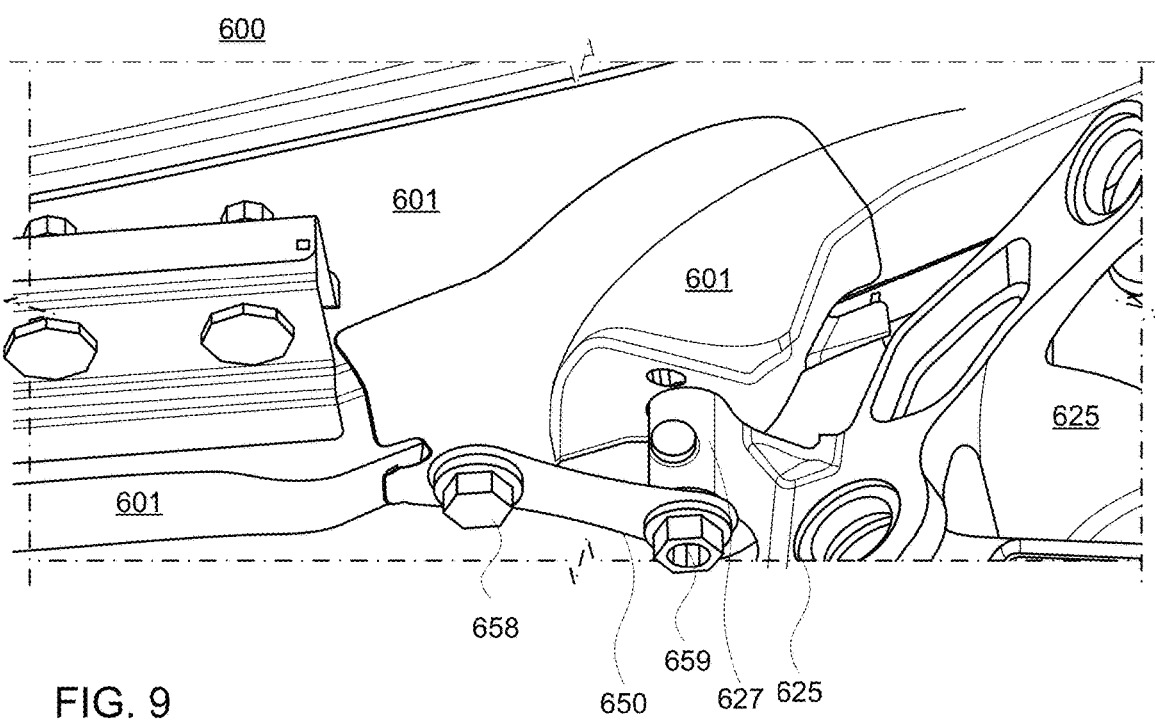
FIG. 9 shows a perspective view, from below, of a portion of the vehicle of FIG. 6, enlarged to show the shear bracket more clearly, in accordance with some embodiments of the present disclosure.
Figure 10:
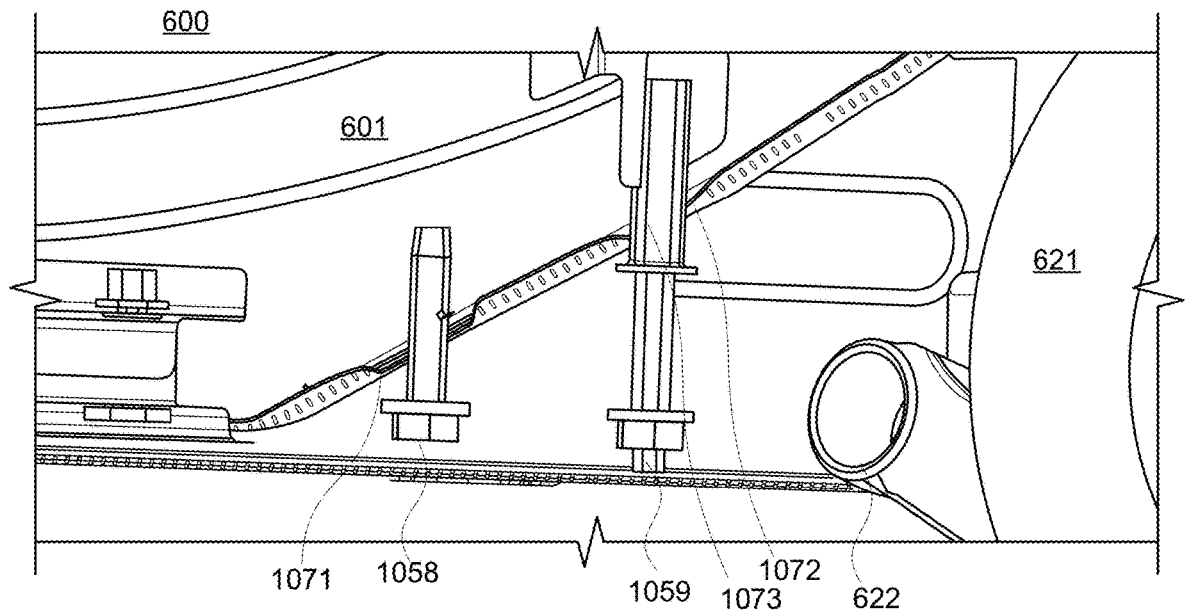
FIG. 10 shows a cross-sectional side view of a portion of the vehicle of FIG. 6, illustrating bolts securing the shear bracket, in accordance with some embodiments of the present disclosure.
Figure 11:
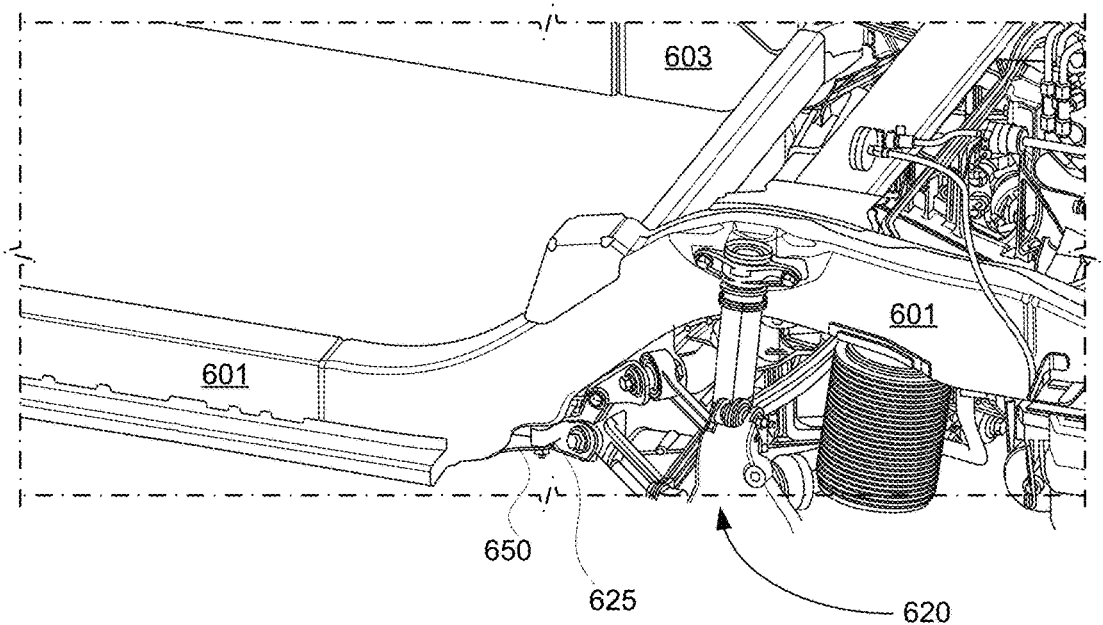
FIG. 11 shows a perspective view, from above, of a portion of the vehicle of FIG. 6, in accordance with some embodiments of the present disclosure.

FIG. 6 shows a bottom view of a portion of vehicle 600 having shear bracket 650, in accordance with some embodiments of the present disclosure. FIG. 7 shows a side view of a portion of vehicle 600 of FIG. 6, in accordance with some embodiments of the present disclosure. FIG. 8 shows a perspective view, from below, of a portion of vehicle 600 of FIG. 6, in accordance with some embodiments of the present disclosure. FIG. 9 shows a perspective view, from below, of a portion of vehicle 600 of FIG. 6, enlarged to show shear bracket 650 more clearly, in accordance with some embodiments of the present disclosure. FIG. 10 shows a cross-sectional side view of a portion of vehicle 600 of FIG. 6, illustrating bolts 1058 and 1059 securing shear bracket 650, in accordance with some embodiments of the present disclosure. FIG. 11 shows a perspective view, from above, of a portion of vehicle 600 of FIG. 6, in accordance with some embodiments of the present disclosure. The frame includes frame elements 601 and 603, and body element 602. Although not illustrated, vehicle 600 may include another shear bracket on the other side of the frame from frame element 601 (e.g., on the passenger side, bolted to second frame element 603). Shear bracket 650, which may be similar to shear brackets 550 and 551 of FIG. 5, is coupled to chassis component 620 and to frame element 601, and is configured to prevent intrusion of chassis component 620 into battery system 610 (e.g., including sheet metal or plastic components affixed to either the frame or chassis component 620). As illustrated, shear bracket 650 includes two holes, one corresponding to frame 601 (e.g., bolted to frame element 601) and one corresponding to chassis component 620 (e.g., bolted to chassis component 620). Chassis component 620 includes element 625, strut 622, rotor 621 and shock 623. Element 625, as illustrated, may include a casting having knuckle 627 that is bolted to shear bracket 650 by bolt 659 (e.g., which is secured to frame element 601). Shear bracket 650 is also secured to frame 601 by bolt 658. To illustrate, during an event, shear bracket 650 provides shear strength to bolt 659, preventing or otherwise reducing the propensity of bolt 659 to fracture. To illustrate further, during an event, shear bracket 650 also prevents or otherwise reduces intrusion by imparting stiffness against deformation (e.g., to limit encroachment of element 625 to the battery system or other components). In some embodiments, shear bracket 650 may be retrofit into vehicle 600, or otherwise included without redesign of chassis component 620. For example, shear bracket 650 may be an add-on component configured to strengthen an existing assembly. Body element 602 is illustrated in FIG. 8, and is affixed to frame element 601.

FIG. 10 shows a cross-sectional side view of a portion of vehicle 600 of FIG. 6, illustrating bolts 1058 and 1059 securing shear bracket 650, in accordance with some embodiments of the present disclosure. Some components are not shown in FIG. 10 for purposes of illustration (e.g., to provide an unobstructed view). Bolt 1058 is configured to secure shear bracket 650 (not shown in FIG. 10) to frame element 601. For example, frame element 601 includes hole 1071 (e.g., at a lateral location), which may include a female thread or through hole (e.g., if a threaded nut is used) configured to accommodate bolt 1058. Further, frame element 601 includes hole 1072 (e.g., at another lateral location), illustrated as having a threaded insert 1073 (e.g., a mounting feature) configured to accommodate bolt 1059. In some embodiments, shear bracket 650 is configured to prevent or otherwise limit failure of bolt 1059 (e.g., at the interface of bolt 1059 and hole 1072), thus preventing or otherwise limiting displacement of element 625 towards a battery system or other components. In some embodiments, hole 1072 may be threaded or include a stud, and threaded insert 1073 need not be included.

Figure 12:
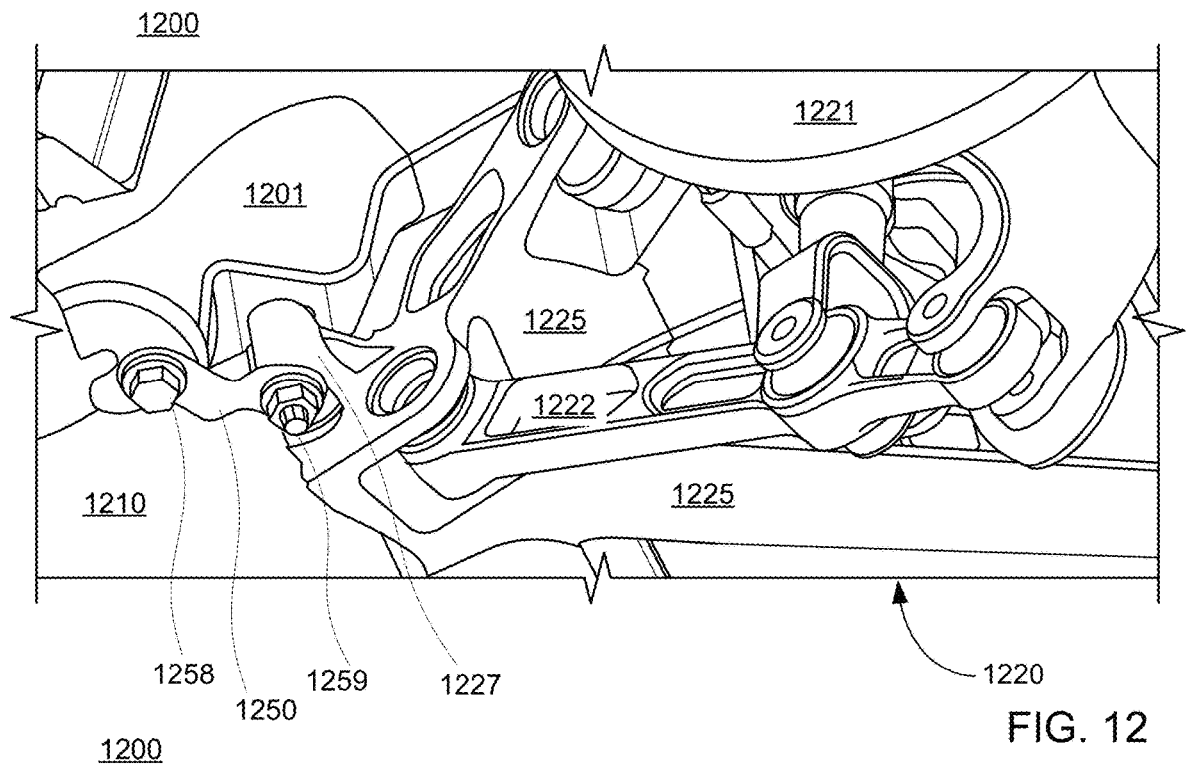
FIG. 12 shows a perspective view, from below, of a portion of a vehicle having a shear bracket undergoing deformation, in accordance with some embodiments of the present disclosure.
Figure 13:
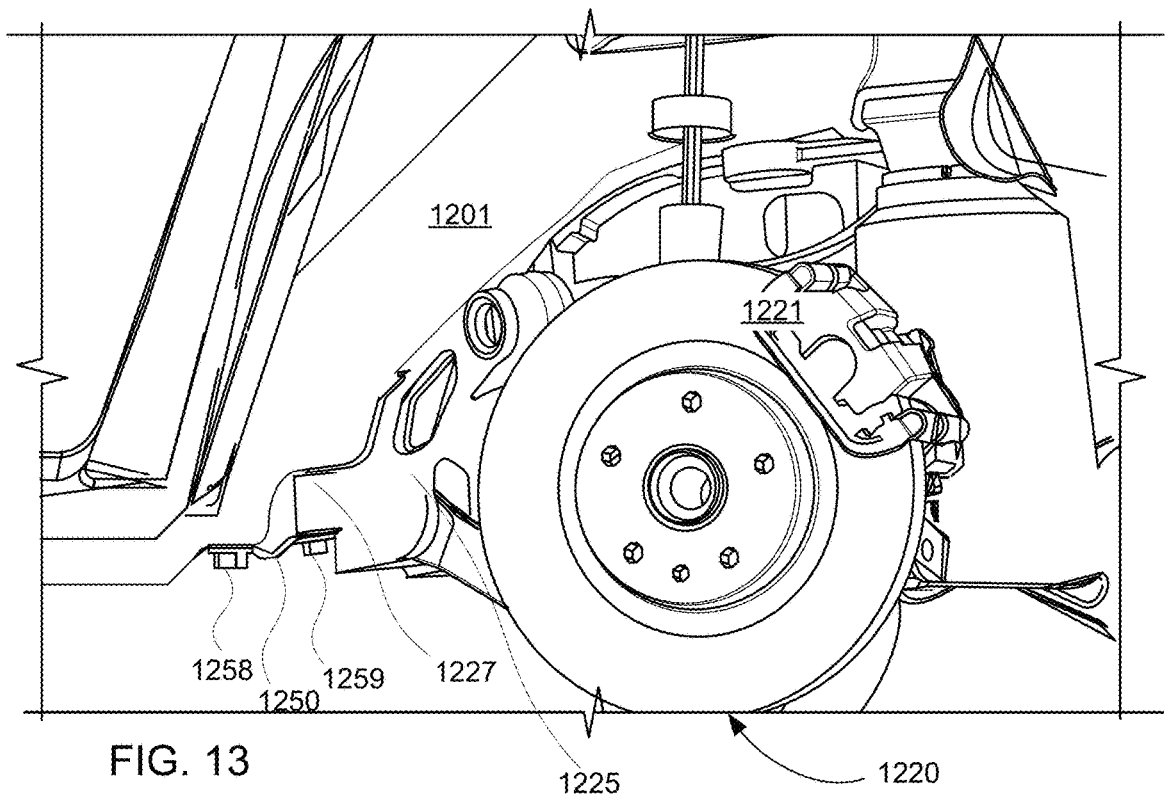
FIG. 13 shows a side view of a portion of the vehicle of FIG. 12, illustrating the shear bracket undergoing deformation, in accordance with some embodiments of the present disclosure.

FIG. 12 shows a perspective view, from below, of a portion of vehicle 1200 having a shear bracket undergoing deformation, in accordance with some embodiments of the present disclosure. FIG. 13 shows a side view of a portion of vehicle 1200 of FIG. 12, illustrating the shear bracket undergoing deformation, in accordance with some embodiments of the present disclosure. Shear bracket 1250 is configured to absorb energy from chassis component 1220 associated with a deceleration event (e.g., also referred to as an event) to reduce energy transferring to battery system 1210. To illustrate, vehicle 1200 is the same as vehicle 600 of FIGS. 6-10, shown during an event wherein vehicle structure is undergoing loading from the event. Although not illustrated, vehicle 1200 may include another shear bracket on the other side of frame 1201. Shear bracket 1250 is coupled to chassis components 1220 and to frame 1201, and is configured to prevent intrusion of chassis components 1220 into battery system 1210 (e.g., including sheet metal or plastic components affixed to frame 1201). As illustrated, shear bracket 1250 includes two holes, one corresponding to frame 1201 (e.g., bolted to frame 1201) and one corresponding to chassis component 1220. Chassis components 1220, as illustrated, includes element 1225 having knuckle 1227, suspension component 1222, and braking components 1221. Shear bracket 1250 is secured to frame 1201 by bolt 1258, at a first location. Element 1225 may be a casting, and knuckle 1227 may be bolted to shear bracket 1250 by bolt 1259 (e.g., which is secured to frame 1201) at a second location. To illustrate, during an event, shear bracket 1250 provides shear strength to bolt 1259, preventing or otherwise reducing the propensity of bolt 1259 to fracture. As illustrated, during the event, shear bracket 1250 may deform, thus dissipating energy from the chassis component and preventing or otherwise reducing intrusion by imparting stiffness against displacement of element 1225 of chassis components 1220 (e.g., to limit encroachment of element 1225 to the battery system or other components). As compared to shear bracket 650 (e.g., the pre-event bracket), shear bracket 1250 has been deformed (e.g., shortened), applying resistance to deformation in a continuous manner rather than a fracture or other impact. Although shown as buckling under flat-bolted end constraints, a shear bracket may be configured to deform in any suitable manner such as, for example, bending, twisting, buckling, folding, or a combination thereof. A shear bracket may include any suitable stiffness, and may be configured to substantially deform, not deform significantly, or fail in a prescribed manner. For example, a shear bracket may be stiffer, or less stiff, than other components of a vehicle that may undergo deformation during an event. In some embodiments, a shear bracket is configured to absorb and dissipate energy by deforming plastically (e.g., in a controlled or otherwise prescribed manner). To illustrate, a shear bracket may be configured to deform less than surrounding components, or deform up to some limit to limit intrusion into the battery system. In an illustrative example, in some embodiments, shear bracket 1250 is configured to buckle between a first location and a second location (e.g., corresponding to bolts 1258 and 1259) from the vehicle frame (e.g., frame 1201) to reduce energy transferring to battery system 1210.

Figure 14:
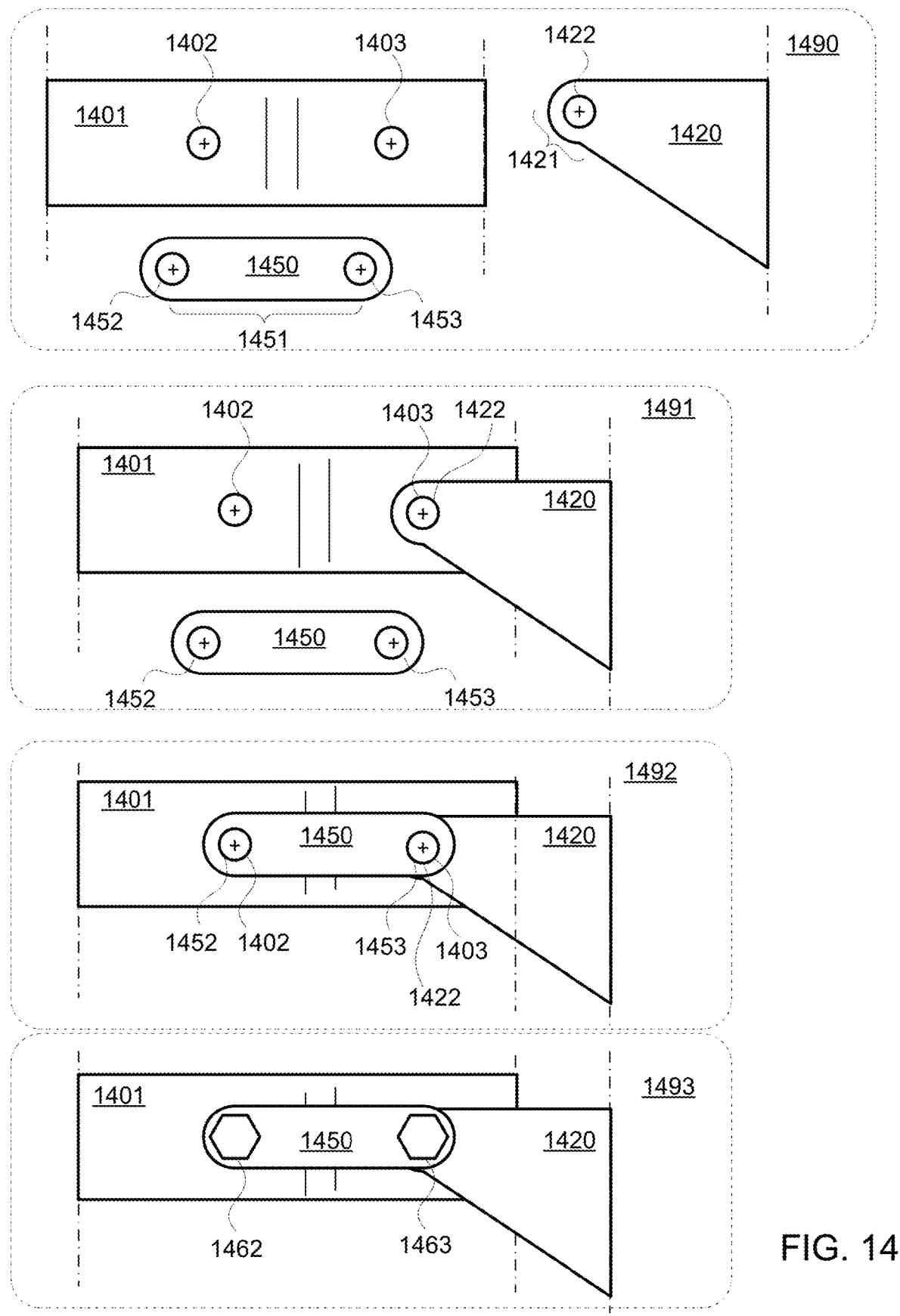
FIG. 14 shows assembly progression views, from the bottom, of an assembly having a shear bracket, in accordance with some embodiments of the present disclosure.
Figure 15:
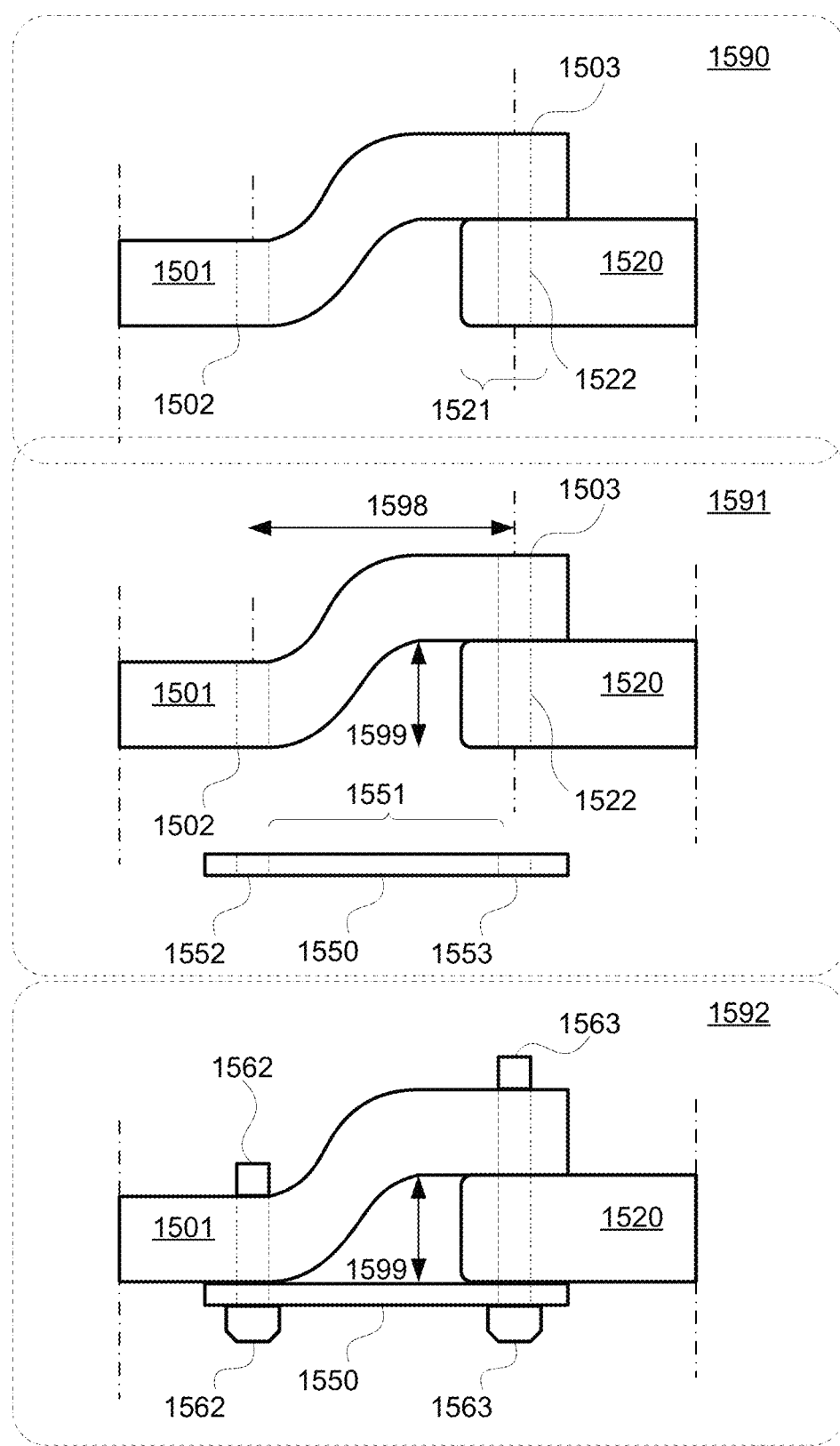
FIG. 15 shows assembly progression views, from the side, of an assembly having a shear bracket, in accordance with some embodiments of the present disclosure.

FIG. 14 shows assembly progression views, from the bottom, of an assembly having shear bracket 1450, in accordance with some embodiments of the present disclosure. Panel 1490 shows a completely unassembled state (e.g., an exploded view), panel 1491 shows chassis component 1420 arranged in place, panel 1492 shows shear bracket 1450 arranged in place, and panel 1493 shows shear bracket 1450 affixed in place. Shear bracket 1450 may be formed from a sheet metal material (e.g., sheet steel), or any other suitable material) having a thickness suitable for stiffening a joint of chassis component 1420 and frame element 1401 (e.g., a thickness of 1-5 mm, a thickness of 4 mm, or any other suitable thickness). As illustrated in FIG. 14, lateral locations are indicated by a "+" indicator (e.g., at each hole, as illustrated). Lateral locations refer to positions in the horizontal plane of the vehicle (e.g., the plane of the page of FIG. 14), while a vertical offset may be included (e.g., into or out of the plane of the page, as illustrated in FIG. 15).

Panel 1490 shows frame element 1401 having mounting locations 1402 and 1403 (e.g., first and second lateral locations), chassis component 1420 having knuckle 1421 and mounting location 1422, and shear bracket 1450 having mounting features 1452 and 1453. Mounting features 1452 and 1453 may include holes, studs (e.g., threaded studs), slots, pins, recessed features, boss features (e.g., protruding from the surface of body 1451), any other suitable feature for mounting shear bracket to frame element 1401 and/or chassis component 1420, or any combination thereof. Shear bracket 1450 includes body 1451, which includes the material spanning the distance between mounting features 1452 and 1453 and material surrounding mounting features 1452 and 1453. The distance between mounting features 1452 and 1453 may be the same as a distance between mounting locations 1402 and 1403. In some embodiments, mounting locations 1402 and 1403 include holes, studs (e.g., threaded studs), slots, pins, recessed features, boss features (e.g., protruding from the surface of body 1451), any other suitable feature for engaging with mounting features 1452 and 1453 of shear bracket 1450, or any combination thereof. Chassis component 1420 includes mounting location 1422, which is configured to be aligned with mounting location 1403 of frame element 1401 and be engaged with mounting feature 1453 of shear bracket 1453. Frame element 1401 may include, at mounting locations 1402 and 1403, a through hole, stud (e.g., threaded studs extending away outwards for interfacing to shear bracket 1450 and frame element 1401), slots, pins, alignment features, any other suitable feature for engaging with shear bracket 1450 or chassis component 1420, or any combination thereof.

Panel 1491 shows chassis component 1420 in place, with mounting location 1422 aligned with mounting location 1403. To illustrate, as shown in FIGS. 7-11, frame element 1401 may curve (e.g., out of the page) to form an offset between mounting locations 1402 and 1403 (e.g., the offset is illustrated in FIG. 15). In some embodiments, mounting location 1422 includes a through hole arranged in knuckle 1421.

Panel 1492 shows shear bracket 1450 arranged in place, with mounting features 1452 and 1453 aligned with mounting locations 1402 and 1403, respectively. Mounting feature 1453 is also aligned with mounting location 1422 of chassis component 1420.

Panel 1493 shows shear bracket 1450 affixed in place, with fasteners 1462 and 1463 (e.g., bolts, screws, threaded nuts, weld joints, pins, or other suitable affixments) engaged with mounting locations 1402 and 1403, respectively. In some embodiments, a shear bracket may include fasteners 1462 and 1463 (e.g., as studs or other protrusions) and accordingly, shear bracket 1450 and fasteners 1462-1463 may be a single component (e.g., formed as a single component or welded together).

In an illustrative example, if shear bracket 1450 were not included, chassis component 1420 could still be fastened to frame 1401 (e.g., using mounting location 1403). Accordingly, the addition of shear bracket 1450 can utilize the existing mounting location (e.g., mounting location 1403) such that only one additional mounting location (e.g., mounting location 1402) is needed to install shear bracket 1450. In a further illustrative example, in some embodiments, shear bracket 1450 may be attached to a separate dedicated location on chassis component 1420 (e.g., as opposed to reusing an existing mounting location such as mounting locations 1402 or 1403). In some embodiments, shear bracket 1450 is configured to buckle between first and second locations (e.g., locations 1402 and 1403) from the vehicle frame (e.g., frame 1401) to reduce the energy transferring to a battery system. In some embodiments, for example, shear bracket 1450 is configured to engage with a first bolt and a second bolt (e.g., fasteners 1462 and 1463) to absorb energy (e.g., by buckling or otherwise deforming) from chassis component 1420 associated with a deceleration event (e.g., to prevent energy transferring to a battery system).

In an illustrative example, shear bracket 1450 and chassis component 1420 are arranged at a first corner of the vehicle, and the chassis component 1420 is affixed to the frame (e.g., frame element 1401) at a first joint located at mounting location 1403. A second chassis component (not shown in FIG. 14, but illustrated in FIG. 3), corresponding to a second wheel and arranged at the second corner of the vehicle, may be included. The second chassis component may be affixed to the frame at a second joint (e.g., the same as illustrated by mounting location 1403). In some such embodiments, a first shear bracket is affixed to the first chassis component and to the frame, and the first shear bracket is configured to resist displacement of the first joint. Further, in some such embodiments, a second shear bracket is affixed to the second chassis component and to the frame, and the second shear bracket is configured to resist displacement of the second joint.

FIG. 15 shows assembly progression views, from the side, of an assembly having shear bracket 1550, in accordance with some embodiments of the present disclosure.

Panel 1590 shows frame element 1501 having mounting locations 1502 and 1503 (e.g., first and second mounting locations), and chassis component 1520 having knuckle 1521 and mounting location 1522. Chassis component 1520 includes mounting location 1522, which is configured to be aligned with mounting location 1503 of frame element 1501. To illustrate, panel 1590 shows a configuration wherein no shear bracket is installed (e.g., prior to installation of a shear bracket, or a system for which a shear bracket may be retrofitted). Frame 1501 may include, at mounting locations 1502 and 1503, a through hole, stud, slots, pins, alignment features, any other suitable feature for engaging with chassis component 1520, or any combination thereof. Chassis component 1520 may include, at mounting locations 1522, a through hole, stud, slots, pins, alignment features, any other suitable feature for engaging with frame element 1501, or any combination thereof.

Panel 1591 shows chassis component 1520 in place, with mounting location 1522 aligned with mounting location 1503. To illustrate, as shown in FIGS. 7-11, frame element 1501 curves (e.g., out of the page) to form offset 1599 (e.g., a vertical offset) between mounting locations 1502 and 1503, wherein mounting locations 1502 and 1503 are spaced laterally by span 1598. In some embodiments, mounting location 1522 includes a through hole arranged in knuckle 1521. Shear bracket 1550 includes body 1551, which includes the material spanning the distance between mounting features 1552 and 1553 and material surrounding mounting features 1552 and 1553. The distance between mounting features 1552 and 1553 may be the same as a distance between mounting locations 1502 and 1503 (e.g., span 1598).

Panel 1592 shows shear bracket 1550 affixed in place, with fasteners 1562 and 1563 (e.g., bolts, screws, threaded nuts, weld joints, pins, or other suitable affixments) engaged with mounting locations 1502 and 1503, respectively. Mounting feature 1553 is also aligned with mounting location 1522 of chassis component 1520. In some embodiments, a shear bracket may include fasteners 1562 and 1563 (e.g., as studs or other protrusions) and accordingly, shear bracket 1550 and fasteners 1562-1563 may be a single component (e.g., formed as a single component or welded together).

In an illustrative example, shear brackets 1450 and 1550 of FIGS. 14-15 may be add-on components. For example, chassis components 1420 and 1520 may be designed to provide steering, suspension, braking, drivetrain, any other suitable function, or any combination thereof, regardless of whether a shear bracket is installed. In a further example, a shear bracket may perform no function during normal operation (e.g., no event), but under loading from an event, a shear bracket may provide stiffness against displacement of a joint between a chassis component and a frame element.

In some embodiments, the present disclosure is directed to a method for manufacturing the assemblies of FIGS. 1-15 for a vehicle having a battery system. In some embodiments, a chassis component such as a casting is configured to be affixed to a frame element at one or more locations to couple the frame element to a wheel. A shear bracket may be installed by affixing the shear bracket to the chassis component and to the frame element. For example, in some embodiments, the shear bracket is affixed to the chassis component at one of the locations where the chassis component is affixed to the frame element (e.g., using the same bolt, wherein the shear bracket includes a hole to accommodate the bolt). In a further example, in some embodiments, the shear bracket is affixed to the chassis component at a dedicated location different from the one or more locations where the chassis component is affixed to the frame element. The shear bracket is affixed to the frame element at a second location to absorb energy from the chassis component undergoing deformation or displacement towards the second location. To illustrate, the shear bracket need not affect operation of the chassis component and may be an add-on component to protect the battery system of the vehicle. During a deceleration event (e.g., such as a crash wherein at least one vehicle decelerates), for example, the shear bracket may absorb energy to avoid the energy being absorbed, converted, or otherwise affecting the battery system.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An assembly comprising:
 a first end of a shear bracket affixed at a first location of a frame element;
 a second end of the shear bracket affixed to a second location of the frame element through a suspension component, wherein the suspension component couples a wheel to the frame element, wherein the shear bracket is configured to absorb energy from the suspension component associated with a deceleration event to reduce energy transferring to a battery system, and wherein the second location is forward of the first location and of the battery system.

2. The assembly of claim 1, wherein the battery system is affixed to the frame element, and wherein the shear bracket is configured to absorb the energy to maintain a gap between the battery system and the suspension component.

3. The assembly of claim 1, wherein the suspension component comprises a knuckle, and wherein the shear bracket is bolted through the knuckle to a mounting feature of the frame element at the second location of the frame element to reduce the energy transferring to the battery system.

4. The assembly of claim 1, wherein the shear bracket comprises:
 a first hole configured to be aligned to the first location of the frame element; and
 a second hole configured to be aligned to the second location of the frame element, wherein the shear bracket is configured to absorb the energy between the first location and the second location.

5. The assembly of claim 1, wherein the shear bracket comprises a sheet metal material configured to provide stiffness against displacement of the suspension component toward the first location, wherein the stiffness further reduces the energy transferring to the battery system.

6. The assembly of claim 1, wherein the shear bracket is configured to buckle between the first location and the second location to reduce the energy transferring to the battery system.

7. The assembly of claim 1, further comprising:
 a first bolt for affixing the shear bracket at the first location of the frame element; and
 a second bolt for affixing the shear bracket at the second location of the frame element, wherein the second bolt also affixes the shear bracket and the suspension component at the second location, and wherein the first and second bolts affix the shear bracket to the frame element to reduce the energy transferring to the battery system.

8. The assembly of claim 7, wherein the shear bracket is configured to engage with the first bolt and with the second bolt to absorb the energy from the suspension component associated with the deceleration event.

9. A vehicle comprising:
 a battery pack affixed to a frame element;
 a shear bracket affixed to the frame element at a first location and at a second location forward of the first location and of the battery pack, wherein a suspension component is affixed at the second location, wherein the suspension component couples a wheel to the frame element, and wherein the shear bracket is configured to absorb energy from the suspension component to reduce energy transferring to the battery pack.

10. The vehicle of claim 9, wherein the suspension component comprises a knuckle, and wherein the shear bracket is bolted to the frame element through the knuckle at the second location to reduce the energy transferring to the battery pack.

11. The vehicle of claim 9, wherein the shear bracket comprises a sheet metal material configured to reduce displacement of the suspension component toward the first location, wherein the reduced displacement further reduces the energy transferring to the battery pack.

12. The vehicle of claim 9, wherein the shear bracket is configured to buckle between the first location and the second location to reduce the energy transferring to the battery pack.

13. The vehicle of claim 9, wherein the shear bracket is bolted to the frame element at the first location and at the second location to absorb the energy.

14. The vehicle of claim 13, further comprising:
a first bolt engaged with a first hole arranged at the first location to affix the shear bracket to the frame element; and
a second bolt engaged with a second hole arranged at the second location to affix the shear bracket and the suspension component to the frame element at the second location.

15. The vehicle of claim 9, wherein the shear bracket is a first shear bracket, the vehicle comprising a second shear bracket affixed to a second suspension component and configured to absorb energy from the second suspension component to reduce energy transferring to the battery pack.

16. An arrangement of a vehicle, the arrangement comprising:
a battery system comprising a first end, the first end corresponding to a first corner and a second corner of the vehicle;
a first suspension component corresponding to a first wheel arranged at the first corner of the vehicle, wherein the first suspension component is affixed to a frame at a first joint;
a second suspension component corresponding to a second wheel arranged at the second corner of the vehicle, wherein the second suspension component is affixed to the frame at a second joint;
a first shear bracket affixed to the frame at a first location and a second location forward of the first location and of the battery system, wherein the first joint is arranged at the second location, and wherein the first shear bracket is configured to absorb energy from the first joint to reduce energy transferring to the battery system; and
a second shear bracket affixed to the frame at a third location and a fourth location forward of the third location, wherein the second joint is arranged at the fourth location, and wherein the second shear bracket is configured to absorb energy from the second joint to reduce energy transferring to the battery system.

17. The arrangement of claim 16, further comprising:
a first frame element of the frame corresponding to the first corner, wherein the first shear bracket is affixed to the first frame element at the first location and at the second location; and
a second frame element of the frame corresponding to the second corner, wherein the second shear bracket is affixed to the second frame element at the third location and at the fourth location.

18. The arrangement of claim 17, wherein the first suspension component comprises a knuckle, the arrangement comprises a first fastener affixing the first shear bracket to the knuckle and to the first frame element at the second location.

19. The arrangement of claim 16, wherein the first shear bracket is configured to maintain a first gap between the battery system and the first suspension component, and wherein the second shear bracket is configured to maintain a second gap between the battery system and the second suspension component.

\* \* \* \* \*